United States Patent
Wen

(10) Patent No.: US 7,881,046 B2
(45) Date of Patent: Feb. 1, 2011

(54) EXPANSION BASE

(75) Inventor: Chen-Hsiung Wen, Taipei Hsien (TW)

(73) Assignee: A-Power International Co., Ltd., Taipei (TW)

( * ) Notice: Subject to any disclaimer, the term of this patent is extended or adjusted under 35 U.S.C. 154(b) by 131 days.

(21) Appl. No.: 12/399,555

(22) Filed: Mar. 6, 2009

(65) Prior Publication Data

US 2010/0014241 A1   Jan. 21, 2010

(30) Foreign Application Priority Data

Jul. 18, 2008  (TW) .............................. 97212826 U

(51) Int. Cl.
*H05K 5/00* (2006.01)
*H05K 7/00* (2006.01)
*G06F 13/00* (2006.01)

(52) U.S. Cl. ........................... 361/679.01; 361/679.41; 710/303

(58) Field of Classification Search ............ 361/679.01, 361/679.41; 710/303, 304
See application file for complete search history.

(56) References Cited

U.S. PATENT DOCUMENTS

| 5,604,663 A * | 2/1997 | Shin et al. .............. 361/679.43 |
| 6,043,976 A * | 3/2000 | Su ......................... 361/679.41 |
| 2006/0061958 A1* | 3/2006 | Solomon et al. ............ 361/686 |

* cited by examiner

*Primary Examiner*—Jayprakash N Gandhi
*Assistant Examiner*—Anthony M Haughton
(74) *Attorney, Agent, or Firm*—C. G. Mersereau; Nikolai & Mersereau, P.A.

(57) ABSTRACT

An expansion base has a body and an amplifier. The body has a front, an outer surface, a container, multiple through holes and a protruding strip. The through holes are formed through the outer surface of the body. The protruding strip is formed transversely on and protrudes from the outer surface at the front of the body. The amplifier is mounted in the container of the body and has at least one woofer mounted in the container adjacent to the through holes and two speaker mounted in the container. When the notebook is placed on the protruding strip, a space is formed between a surface and the notebook for improved user-comfort and heat dissipation. The notebook is connected to the amplifier for improved sound.

12 Claims, 5 Drawing Sheets

EXPANSION BASE

BACKGROUND OF THE INVENTION

1. Field of the Invention

The present invention relates to an expansion base, especially an expansion base for improved sound and heat dispersion.

2. Description of the Prior Arts

Standard notebooks are too small for additional heat sinks to be implemented so the notebooks are only cooled by thermal convection from a cover of the notebook to outside air. Besides, the standard notebook has small speakers to save weight so sound quality is low. Therefore, when the people use the notebook, heat generated by the notebook accumulates inside the notebook reducing performance and may even damage the notebook.

To overcome the shortcomings, the present invention provides an expansion base to mitigate or obviate the aforementioned problems.

SUMMARY OF THE INVENTION

The main objective of the present invention is to provide an expansion base, especially to an expansion base for improved sound and heat dispersion.

An expansion base in accordance with the present invention has a body and an amplifier. The body has a front, an outer surface, a container, multiple through holes and a protruding strip. The through holes are formed through the outer surface of the body. The protruding strip is formed transversely on and protrudes from the outer surface at the front of the body. The amplifier is mounted in the container of the body and has at least one woofer and two speakers. The at least one woofer is mounted in the container adjacent to the through holes of the body. Each tweeter is mounted in the container.

When the notebook is placed on the protruding strip a space is formed between a surface and the notebook for improved user-comfort and heat dissipation. The notebook is connected to the amplifier for improved sound.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
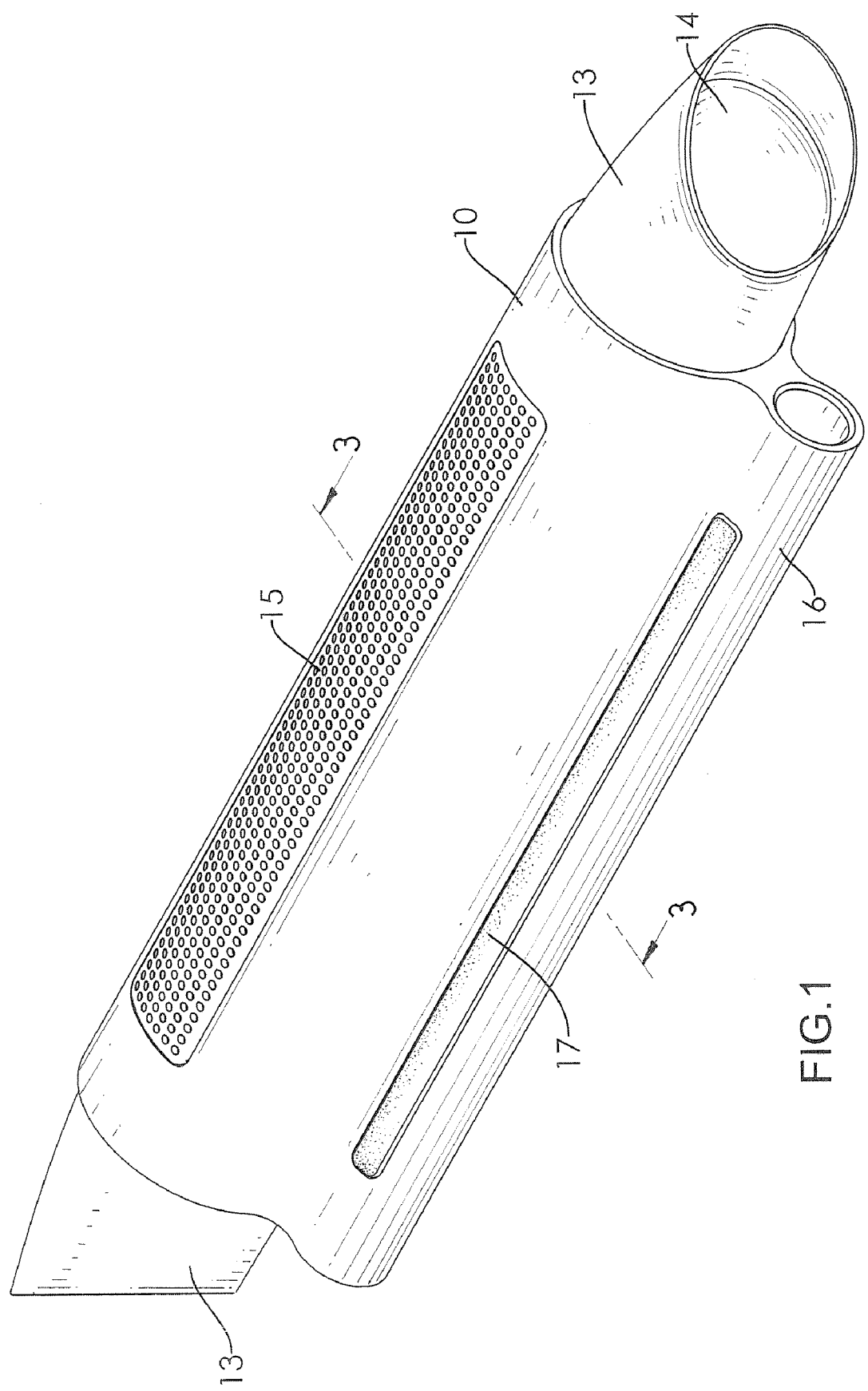
FIG. 1 is a perspective view of an expansion base in accordance with the present invention.
Figure 2:
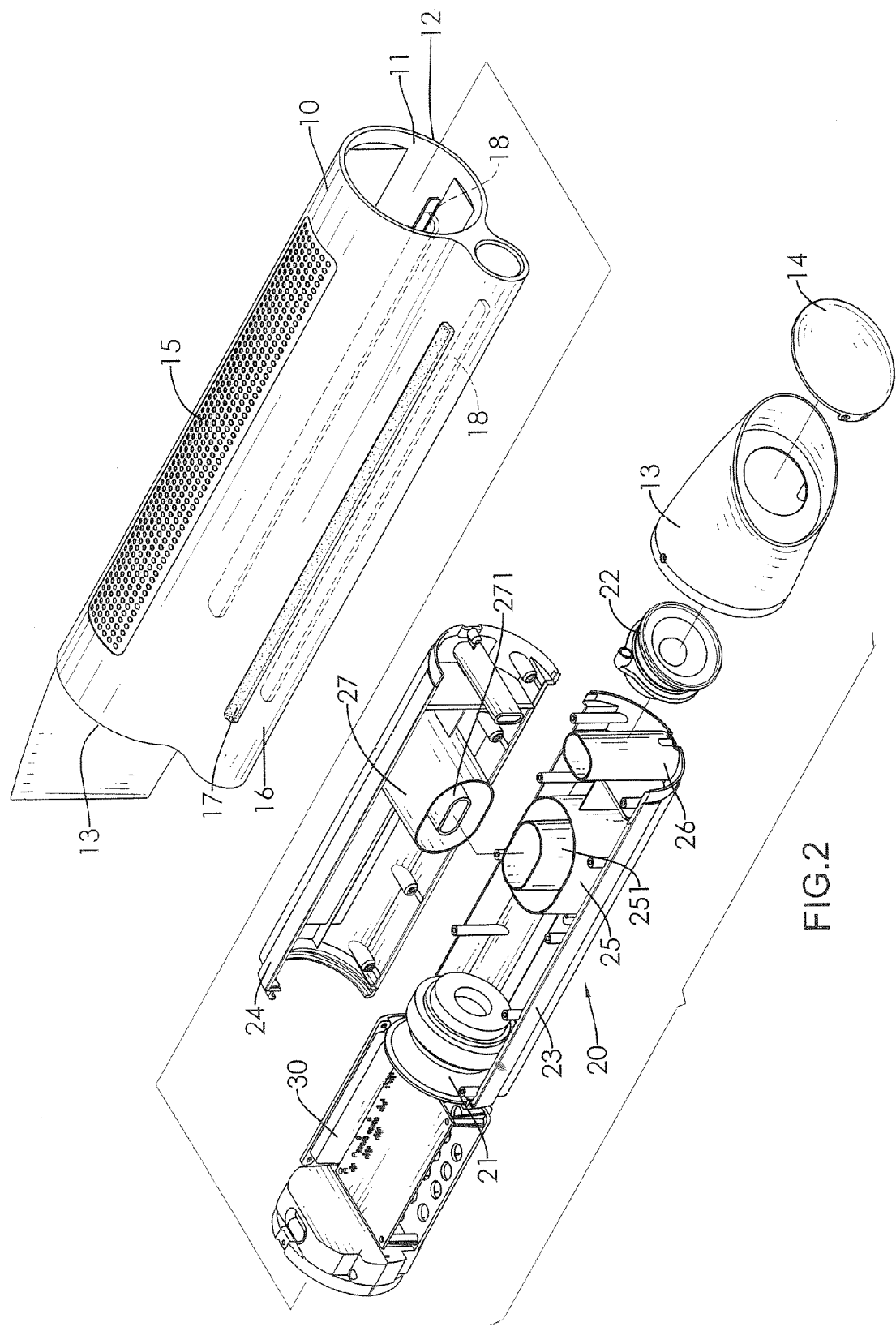
FIG. 2 is an exploded perspective view of the expansion base in FIG. 1.
Figure 3:
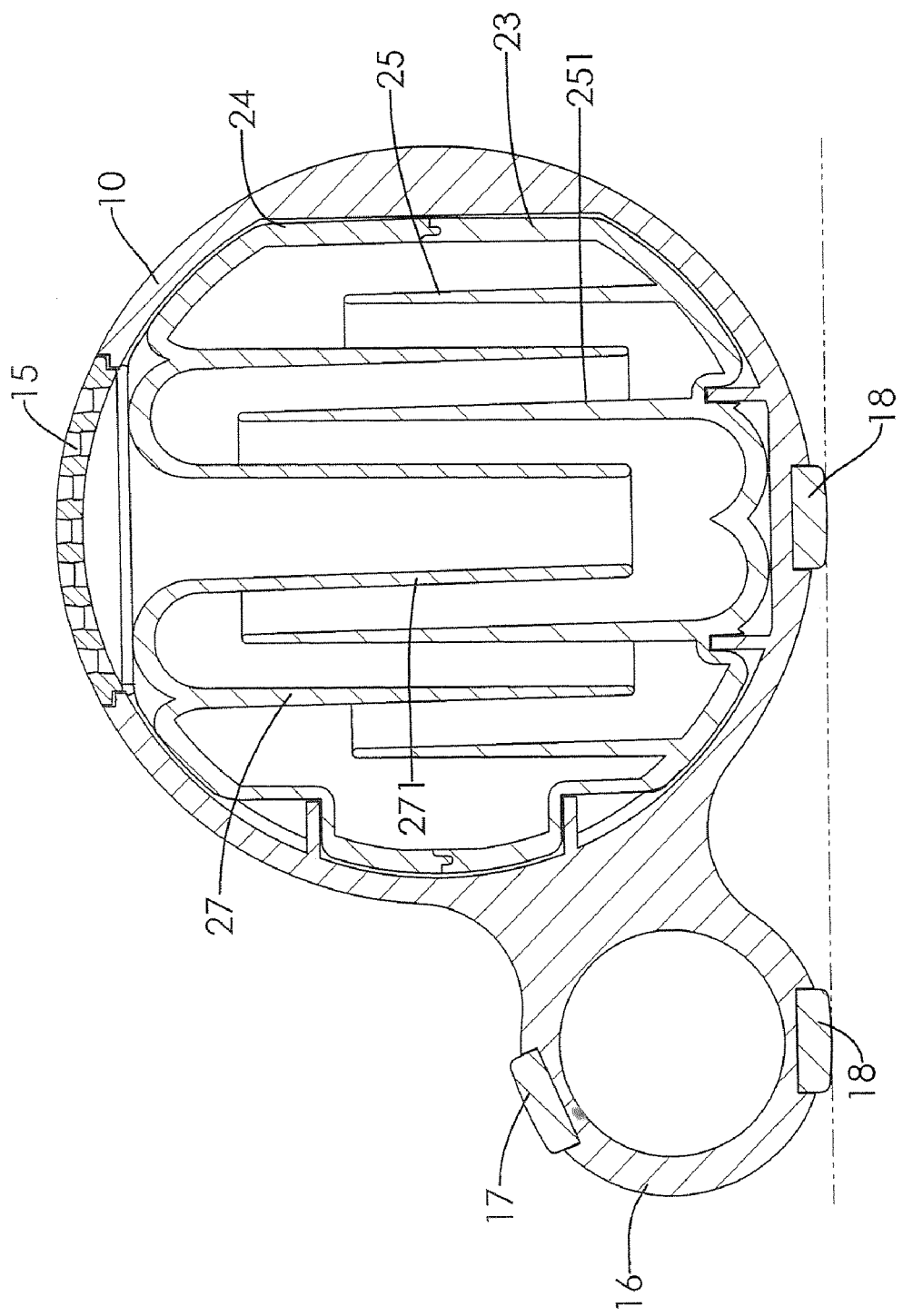
FIG. 3 is a side view of the expansion base along 3-3 line in FIG. 1.
Figure 4:
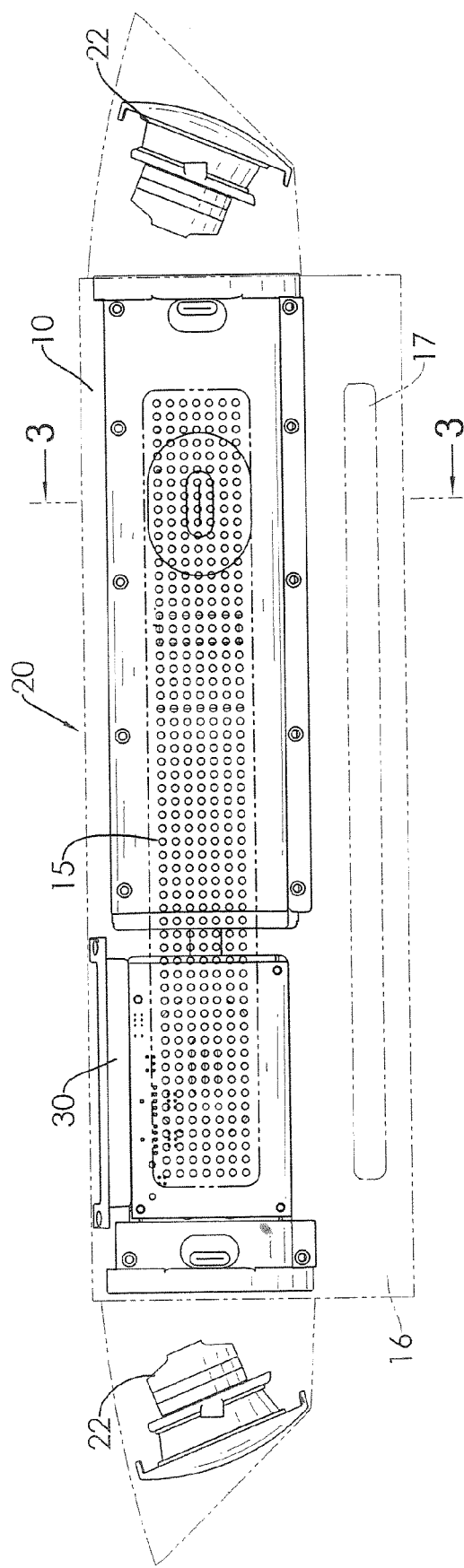
FIG. 4 is a top view of the expansion base in FIG. 1.

With reference to FIGS. 1 to 4, an expansion base in accordance with the present invention has a body (10), an amplifier (20) and a controller (30).

The body (10) has a front, a back, an outer surface, a container (11), multiple through holes (15), a protruding strip (16), multiple skid-proof strips (17, 18) and a mounting hole (19).

The container (11) is formed transversely through the body (10) and has two ends, two openings (12) and two sleeves (13).

The openings (12) are formed respectively in the ends of the container (11).

The sleeves (13) are mounted respectively on the openings (12) of the container (11) and each sleeve (13) has an inner surface and a dust-proof cover (14). The dust-proof cover (14) is mounted on the inner surface of the sleeve (14) to seal the container (11) from dust.

The through holes (15) are formed through the outer surface of the body (10) and may have various sizes for improved acoustic or aesthetic effects. Preferably, the through holes (15) are formed longitudinally in lines from end to end of the container and a central line is formed from larger through holes (15) with adjacent lines gradually decreasing.

The protruding strip (16) is formed transversely on and protrudes from the outer surface at the front of the body (10) and may be mounted on a notebook or a DVD player.

The skid-proof strips (17, 18) are mounted transversely on the protruding strip (16) and on the body (10) to prevent movement of the body (10) relative to a notebook and a surface.

The mounting hole (19) is formed in the outer surface at the back of the body (10).

The amplifier (20) is mounted in the container (11) of the body (10) and has a seat (23), a cover (24), at least one woofer (21) and two speakers (22).

The seat (23) has a top surface, a first end, a second end, a first ring wall (25) and a third ring wall (26). The first ring wall (25) is formed on the top surface of the seat (23) and has a first sound wall (251). The first sound wall (251) is formed in the first ring wall (25) of the seat (23). The third ring wall (26) is formed on the top surface and is adjacent to the second end of the seat (23).

The cover (24) is mounted on the seat (23) and has a first hole, a second ring wall (27), a second hole and a fourth ring wall (28).

The first hole is formed on the cover (24) and corresponds to the first ring wall (25) of the seat and has a rim. The second ring wall (27) is formed on the rim of the first hole and is mounted between the first ring wall (25) and the first sound wall (251) and has top edge and a second sound wall (271). The second sound wall (271) is formed on the top edge of the second ring wall (27) and mounted in the first sound wall (251) of the seat (23).

The second hole is formed on the cover (24) and corresponds to the third ring wall (26) of the seat and has a rim. The fourth ring wall (28) is formed on the cover (24) and is mounted in the third ring wall (26) of the seat (23).

The at least one woofer (21) is mounted in the container (11) adjacent to the through holes (15) of the body (10). In the performed embodiment, the at least one woofer (21) is mounted on the first end of the seat (23) and is covered the cover (24).

The speakers (22) are mounted in the container (11) and may be mounted in the sleeves (13). In the performed embodiment, The speakers (22) are mounted on the seat (23) adjacent to the second end of the seat (23).

The controller (30) is mounted in the mounting hole (19) of the body (10) and is connected to the amplifier (20) to control characteristics of the amplifier (20) such as bass, treble, volume and the like and has at least one actuator and at least one jack adapted to connect to the notebook or the DVD player and a power source. The at least one actuator may be a power switch, a volume control, a bass control a treble control or the like. The at least one jack may be a USB port, a headphone jack, a power socket or the like. The power source may be the notebook.

Figure 5:
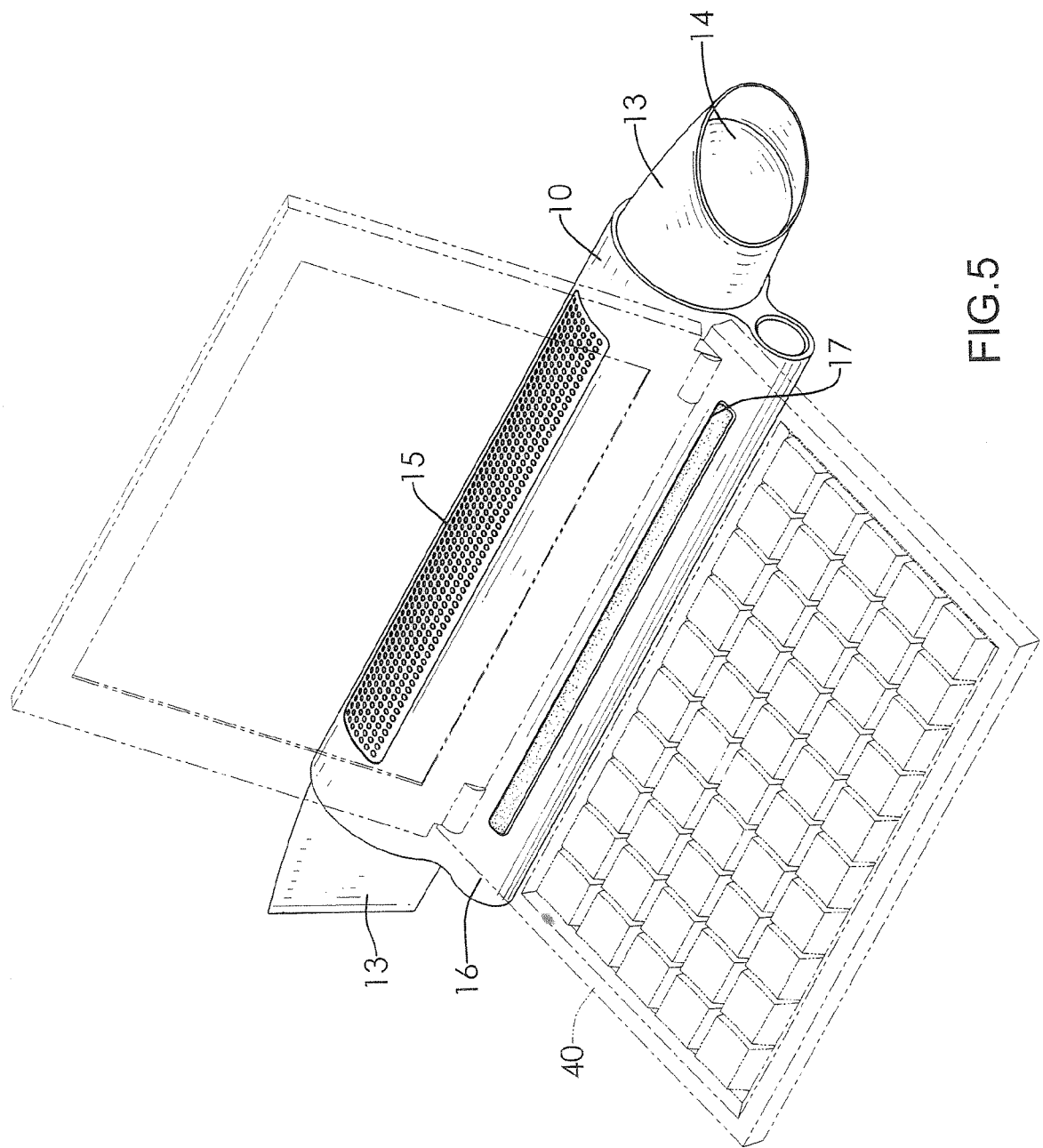
FIG. 5 is a perspective view of the expansion base, showing a notebook placed on the expansion base for notebooks.

The expansion base can be used for a notebook or a DVD player. With further reference to FIG. 5, the expansion base for notebooks (40) is placed on a surface, such as a table, desk, chair or the like and the notebook is placed on the protruding strip (16). Therefore, the notebook (14) is not mounted flatly on the surface for improved writing comfort for a user. Furthermore, a space is formed between the notebook surface so heat can be dispersed to the environment to prevent heat damage to the notebook. Besides, the notebook (40) can be connected to amplifier (20) by the controller (30) for improved sound.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An expansion base comprising
   a body having
      a front;
      a back;
      an outer surface;
      a container being formed transversely through the body and having
         two ends; and
         two opening being formed respectively in the ends of the container;
            multiple through holes being formed through the outer surface of the body and having; and
      a protruding strip being formed transversely on and protruding from the outer surface at the front of the body; and
   an amplifier being mounted in the container of the body and having
      at least one woofer being mounted in the container adjacent to the through holes of the body; and
      two speakers being mounted in the container.

2. The expansion base as claimed in claim 1, wherein the body further has multiple skid-proof strips being mounted transversely on the protruding strip and body.

3. The expansion base as claimed in claim 1, wherein
   the body further has a mounting hole being formed in the outer surface at the back of the body; and
   the expansion base further has a controller being mounted in the mounting hole of the body and being connected to the amplifier.

4. The expansion base as claimed in claim 2, wherein
   the body further has a mounting hole being formed on the outer surface of the back of the body; and
   the expansion base for notebooks further has a controller being mounted in the mounting hole of the body and being connected to the amplifier.

5. The expansion base as claimed in claim 3, wherein the controller further has two connecting holes.

6. The expansion base as claimed in claim 4, wherein the controller further has two connecting holes.

7. The expansion base as claimed in claim 5, wherein the controller further has at least one jack and a power source.

8. The expansion base as claimed in claim 6, wherein the controller further has at least one jack and a power source.

9. The expansion base as claimed in claim 7, the amplifier further has
   a seat having
      a top surface;
      a first end;
      a second end;
      a first ring wall being formed on the top surface of the seat and having a first sound wall being formed in the first ring wall of the seat; and
      a third ring wall being formed on the top surface and being adjacent to the second end of the seat; and
   a cover being mounted on the seat and having
      a first hole being formed on the cover and corresponding to the first ring wall of the seat and having a rim;
      a second ring wall being formed on the rim of the first hole and being mounted between the first ring wall and the first sound wall and having
         a top edge; and
         a second sound wall being formed on the top edge of the second ring wall and mounted in the first sound wall of the seat;
      a second hole being formed on the cover and corresponding to the third ring wall of the seat and has a rim; and
      a fourth ring wall being formed on the cover and being mounted in the third ring wall of the seat; wherein
   the at least one woofer is mounted on the first end of the seat and is covered the cover; and
   the speakers are mounted on the seat adjacent to the second end of the seat.

10. The expansion base as claimed in claim 8, the amplifier further has
   a seat having
      a top surface;
      a first end;
      a second end;
      a first ring wall being formed on the top surface of the seat and having a first sound wall being formed in the first ring wall of the seat; and
      a third ring wall being formed on the top surface and being adjacent to the second end of the seat; and
   a cover being mounted on the seat and having
      a first hole being formed on the cover and corresponding to the first ring wall of the seat and having a rim;
      a second ring wall being formed on the rim of the first hole and being mounted between the first ring wall and the first sound wall and having
         a top edge; and
         a second sound wall being formed on the top edge of the second ring wall and mounted in the first sound wall of the seat;
      a second hole being formed on the cover and corresponding to the third ring wall of the seat and has a rim; and
      a fourth ring wall being formed on the cover and being mounted in the third ring wall of the seat; wherein
   the at least one woofer is mounted on the first end of the seat and is covered the cover; and
   the speakers are mounted on the seat adjacent to the second end of the seat.

11. The expansion base as claimed in claim 9, wherein the container further has two sleeves being mounted respectively on the openings of the container and each sleeve having
   an inner surface; and
   a dust-proof cover being mounted on the inner surface.

12. The expansion base for notebooks as claimed in claim 10, wherein the container further has two sleeves being mounted respectively on the openings of the container and each sleeve having
   an inner surface; and
   a dust-proof cover being mounted on the inner surface.

* * * * *